(No Model.)
E. O. BRYDEN.
HUB.
No. 542,330. Patented July 9, 1895.
*Fig. 1.*
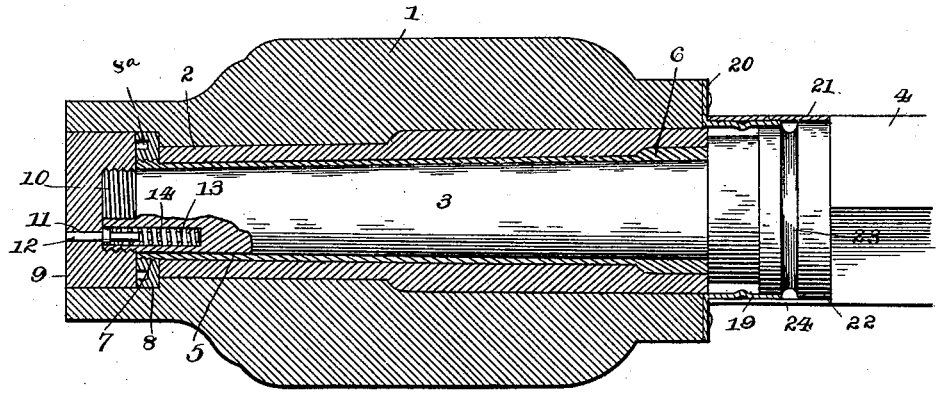
*Fig. 2.*     *Fig. 5.*     *Fig. 6.*
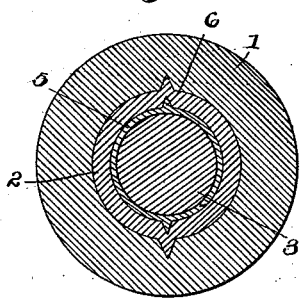 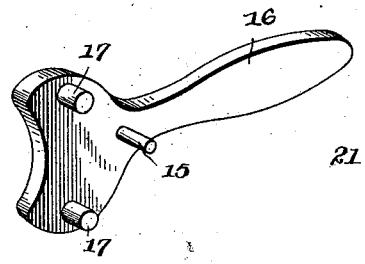 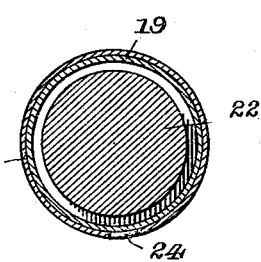
*Fig. 3.*
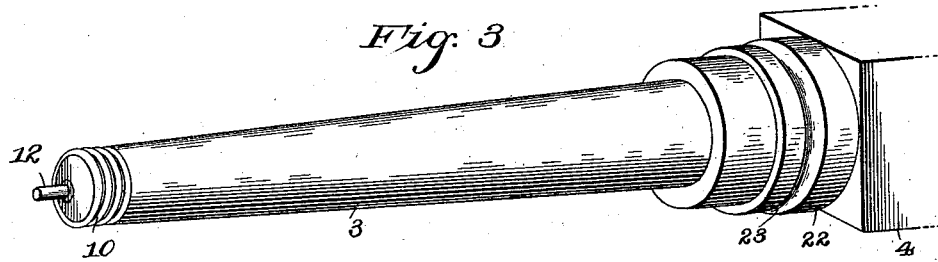
*Fig. 4.*
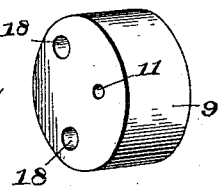
Witnesses
Chas. A. Ford.
H. T. Wiley
Inventor
Edward O. Bryden,
By his Attorneys.
C. A. Snow & Co.

UNITED STATES PATENT OFFICE.

EDWARD ORLANDO BRYDEN, OF CHICAGO, ILLINOIS, ASSIGNOR OF ONE-HALF TO W. F. COMBS, OF RENO CITY, OKLAHOMA TERRITORY.

HUB.

SPECIFICATION forming part of Letters Patent No. 542,230, dated July 9, 1895.

Application filed July 12, 1894. Serial No. 517,330. (No model.)

*To all whom it may concern:*

Be it known that I, EDWARD ORLANDO BRYDEN, a citizen of the United States, residing at Chicago, in the county of Cook and State of Illinois, have invented a new and useful Hub, of which the following is a specification.

The invention relates to improvements in hubs.

The object of the present invention is to improve the construction of hubs, to prevent the axle-box or axle from becoming worn, to exclude dust and dirt from the hub, and to securely lock the axle-nut against accidentally unscrewing.

The invention consists in the construction and novel combination and arrangement of parts hereinafter fully described, illustrated in the accompanying drawings, and pointed out in the claims hereto appended.

In the drawings, Figure 1 is a longitudinal sectional view of a hub provided with my improvements. Fig. 2 is a transverse sectional view. Fig. 3 is a detail perspective view of the spindle, illustrating the construction of the sand-band. Fig. 4 is a detail perspective view of the axle-nut. Fig. 5 is a similar view of the wrench. Fig. 6 is a sectional view taken transversely through the cylindrical portion of the axle and illustrating the construction of the sand-band.

Like numerals of reference indicate corresponding parts in all the figures of the drawings.

1 designates a hub provided with the usual axle-box 2, and interposed between the latter and the spindle 3 of an axle 4 is a lining or skein 5, which is constructed of soft metal, such as brass, Babbitt metal, or the like. The lining 5, which is slightly tapering to correspond to the configuration of the spindle, is rigidly secured to the axle-box and rotates with the same. Its inner end is provided with oppositely outward extending flanges 6, which interlock with corresponding receses of the axle-box, and its outer end 7 is threaded and receives a threaded collar or nut 8, which screws against the outer end of the axle-box and draws the lining into the same. This collar or nut 8 is located within the hub and is of the same diameter as the opening of the outer end of the latter and is provided with opposite sockets 8ª to be engaged by a suitable tool for turning the nut or collar.

The collar or nut 8 forms a double function of retaining the lining in the axle-box, and securing the latter in the hub, as the inner ends of the lining and the axle-box are interlocked and the nut or collar 8 not only engages the outer end of the axle-box, but bears against a shoulder of the hub, as clearly shown in Fig. 1 of the accompanying drawings.

The outer end of the hub is closed by a circular nut 9, which screws on the threaded nut 10 of the spindle and which retains the hub thereon, similar to the ordinary construction of axle-nut, and it bears against the nut 8 and conceals the same. The axle-nut is provided with an eccentrically-located opening 11, which when the nut is screwed home is engaged by a spring-actuated bolt 12, mounted in a socket 13 of the spindle. When the nut is being screwed on the axle, the bolt is held depressed within the socket 13 against the action of a spring 14 by a projection 15 of a wrench 16, which is also provided with studs 17 to engage corresponding sockets 18 of the axle-nut, whereby the latter is rotated. As soon as the wrench is removed the spring-actuated bolt will engage the opening 11 if the latter registers with the socket 13, and when it is desired to remove the nut the wrench is placed in position and the projection 15, entering the opening 11, depresses the spring-actuated bolt, releasing the nut, which is then freely turned.

In order to render the rear or inner end of the hub dust-proof, a sleeve 19 is secured to and is carried by the hub. The sleeve is provided with an annular securing-flange 20, provided with perforations to receive the screws or other suitable fastening devices, and it is received within a sand-band 21, which is secured to and projects outward from a cylindrical portion 22 of the axle. The cylindrical portion 22 of the axle is provided with an annular groove 23, and the sleeve fits on the adjacent end of the cylindrical portion 22 and terminates at the groove 23 thereof. The sand-band is provided with an opening or space 24, which is formed by separating the ends of the piece of sheet metal of which it is constructed, and this opening or space provides an escape for dust. Any dust entering the sand-band will be conveyed to the groove or be caused to drop through the opening or space 24 by the rotation of the sleeve. The enlarged cylindrical portion 22 forms a shoulder at the adjacent end of the body of the axle, and the sand-band 21 fits against the same.

It will be seen that the hub is simple and comparatively inexpensive in construction, that the soft-metal lining prevents the axle and the axle-box from being worn, and that the circular axle-nut fitting snugly within the outer end of the hub makes the latter dust-proof at that point. It will also be seen that the sand-band and the adjacent construction make the hub dust-proof at its inner end, and that the axle-nut is securely locked against accidentally unscrewing and cannot be tampered with by mischievous persons.

Changes in the form, proportion, and the minor details of construction may be resorted to without departing from the principle or sacrificing any of the advantages of this invention.

What I claim is—

1. The combination of a hub provided at its outer end with an interior annular shoulder, an axle box arranged within the hub, the removable lining fitting within the axle box and having its rear end interlocked with the same, and having its front end extended beyond the axle box and the shoulder of the hub and threaded, the nut 8 arranged on the threaded end of the lining and engaging both the axle box and the shoulder of the hub and locking both the axle box and the lining therein, said nut 8 being of the same diameter as the interior of the outer end of the hub, a spindle receiving the lining and extending beyond the same, and an axle nut screwing on the spindle and fitting within and filling the outer end of the hub and concealing the nut 8, substantially as described.

2. The combination of a spindle having the ordinary shoulder and provided beyond the same with an enlarged cylindrical portion 22, having an annular groove 23 and forming a shoulder at the body of the axle, a sand band arranged on the enlarged cylindrical portion 22 and fitting against the shoulder of the body of the axle and provided at its bottom with an opening, and a hub fitting against the adjacent ends of the sand band and provided with a sleeve located within the sand band and supported by the adjacent end of the enlarged cylindrical portion 22 and terminating at the groove thereof, substantially as described.

3. The combination of a spindle having its outer end threaded and provided with a longitudinal socket, a spring actuated bolt mounted in the socket of the spindle and disposed longitudinally thereof and projecting outward therefrom, and a circular nut fitting on the outer threaded end of the spindle, and provided in its outer face with a pair of sockets, and having an opening extending entirely through it and receiving the projecting portion of the bolt, the latter having its outer end flush with the outer face of the nut and entirely filling said opening, said nut being adapted to be screwed on or off the spindle by a tool having a pair of rigid projections to interlock with the sockets, and provided with a pin of greater length than the projections to fit in the opening for depressing the bolt and holding the same out of engagement with the nut, substantially as described.

In testimony that I claim the foregoing as my own I have hereto affixed my signature in the presence of two witnesses.

EDWARD ORLANDO BRYDEN.

Witnesses:
A. E. LITTLE,
J. H. HILTON.